No. 675,711. Patented June 4, 1901.
M. M. BROPHY.
DEVICE FOR SEPARATING MECHANICAL IMPURITIES FROM STEAM.
(Application filed Mar. 5, 1901.)
(No Model.)
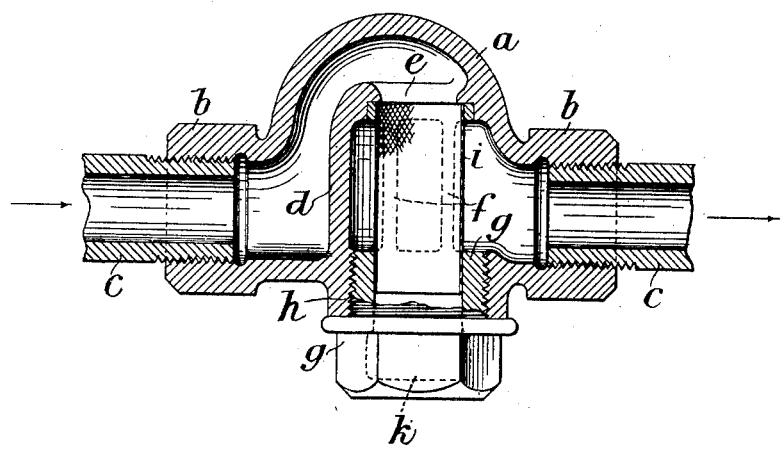
Witnesses.
Inventor.

United States Patent Office.

MICHAEL MARY BROPHY, OF LONDON, ENGLAND.

DEVICE FOR SEPARATING MECHANICAL IMPURITIES FROM STEAM.

SPECIFICATION forming part of Letters Patent No. 675,711, dated June 4, 1901.

Application filed March 5, 1901. Serial No. 49,933. (No model.)

*To all whom it may concern:*

Be it known that I, MICHAEL MARY BROPHY, a subject of the Queen of Great Britain, residing at 251 High Holborn, London, England, have invented a new and useful Improved Device for Separating Mechanical Impurities from Steam, of which the following is a specification.

My invention relates to improved means for separating dirt—such as particles of jointing material, pipe-scale, and iron-chips, which are so injurious to valve-faces, valve-seatings, and the like—from steam; and it consists in combining with a shell or casing, through which the steam is caused to pass, a diaphragm or screen of wire-gauze, the said diaphragm or screen being carried by a plug screwed into the casing and permitting of the ready cleansing or renewal of the diaphragm.

To enable my invention to be fully understood, I will describe the same by reference to the accompanying drawing, which illustrates in longitudinal section a separator constructed according to my said invention.

$a$ is a shell or casing having sockets $b\ b$ or the like for the attachment of steam-pipes, such as $c\ c$, and containing an internal partition $d$, provided with an aperture $e$, so arranged that the steam passing from one side of the partition to the other will pass through the said aperture. In connection with this aperture is arranged a cage $f$, carried by a plug $g$, adapted to be screwed into an aperture $h$ in the casing opposite to the aperture $e$ and designed to carry a tube or thimble $i$, of wire-gauze. When the said cage provided with the wire-gauze is inserted into position, it will coöperate with or seat around the aperture $e$ in the partition in such a manner that the steam flowing through the said aperture will be compelled to pass through the wire-gauze, upon which the dirt will be deposited. In the plug is formed a cup or chamber $k$ for receiving the deposit collected by the gauze tube, or, if desired, the said plug may be adapted to have an additional vessel attached to it, which may be removed from time to time, if required, without disturbing the separator.

The great advantage of my invention is that when the gauze and its chamber become clogged or inoperative it is simply necessary to remove the plug, when the cage and the gauze, together with the contained dirt, are taken out together, when the gauze can be cleaned or new gauze substituted for it.

Having now particularly described and ascertained the nature of my said invention and in what manner the same is to be performed, I declare that what I claim is—

1. In a steam-separator, the combination with the shell or casing provided with a cleaning-aperture, of a detachable closing device for said aperture provided with a dirt-receptacle, and a screen within said casing adjacent to said closing device, substantially as described.

2. In a steam-separator, the combination with the shell or casing provided with a cleaning-aperture, of a detachable closing device for said aperture, a screen located in said receptacle and secured to said closing device whereby said screen will be removed with said detachable closing device, substantially as described.

3. In a steam-separator, the combination with the shell or casing provided with a cleaning-aperture, and having means for connecting pipes thereto, of a detachable closing-plug for said aperture, a cylindrical screen secured to said plug, said plug having a dirt-receptacle in communication with said screen, substantially as described.

4. In a steam-separator, the combination with the shell or casing, provided with a partition having an aperture therein, a cleaning-aperture in line with said aperture in said partition and means for receiving pipes, on opposite sides of said partition, of a detachable plug for closing said cleaning-aperture, and a cylindrical screen secured to said plug and engaging the aperture in said partition, substantially as described.

MICHAEL MARY BROPHY.

Witnesses:
JOHN E. BOUSFIELD,
C. G. REDFERN.